(12) United States Patent
Moon (10) Patent No.: US 9,380,543 B2
(45) Date of Patent: Jun. 28, 2016

(54) APPARATUS AND METHOD FOR RANDOM ACCESS CHANNEL TRANSMISSION CONSIDERING REVERSE CHANNEL STATUS IN WIRELESS COMMUNICATION SYSTEM

(75) Inventor: Hi-Chan Moon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 12/925,520

(22) Filed: Oct. 22, 2010

(65) Prior Publication Data

US 2011/0096686 A1    Apr. 28, 2011

(30) Foreign Application Priority Data

Oct. 22, 2009 (KR) ................. 10-2009-0100626
Oct. 21, 2010 (KR) ................. 10-2010-0103077

(51) Int. Cl.
*H04B 7/216*     (2006.01)
*H04W 52/50*     (2009.01)
*H04L 25/02*     (2006.01)
*H04W 74/08*     (2009.01)
*H04W 52/14*     (2009.01)
*H04W 52/24*     (2009.01)

(52) U.S. Cl.
CPC .......... *H04W 52/50* (2013.01); *H04L 25/0224* (2013.01); *H04W 74/0833* (2013.01); *H04W 52/146* (2013.01); *H04W 52/242* (2013.01)

(58) Field of Classification Search
CPC ............... H04B 2201/70701; H04W 52/50
USPC ......................... 370/335, 336, 337
See application file for complete search history.

(56) References Cited

U.S. PATENT DOCUMENTS

| | | | |
|---|---|---|---|
| 7,069,033 B1 * | 6/2006 | Moon ............... | H04W 52/10 455/115.3 |
| 7,212,790 B2 | 5/2007 | Furukawa | |
| 8,897,828 B2 | 11/2014 | Anderson | |
| 2002/0102986 A1 | 8/2002 | Iwamura et al. | |
| 2002/0111183 A1 * | 8/2002 | Lundby ....................... 455/522 | |
| 2004/0132415 A1 | 7/2004 | Furukawa | |
| 2004/0179627 A1 * | 9/2004 | Ketchum et al. .............. 375/267 | |

(Continued)

FOREIGN PATENT DOCUMENTS

| | | |
|---|---|---|
| CN | 101385270 A | 3/2009 |
| CN | 101494482 A | 7/2009 |

(Continued)

OTHER PUBLICATIONS

European Search Report dated Jan. 18, 2011 in connection with European Patent Application No. EP 10 18 8475.

(Continued)

*Primary Examiner* — Hassan Kizou
*Assistant Examiner* — Abdelnabi Musa (57) ABSTRACT

An apparatus is capable of transmitting a signal through a Random Access Channel in a wireless communication system. The method of transmitting a signal through a random access channel includes estimating a reverse channel status using a signal received through a forward link, determining whether to transmit a signal through a random access channel in consideration of the reverse channel status, and transmitting a signal through the random access channel when it is determined to transmit a signal through the random access channel.

20 Claims, 6 Drawing Sheets

(56) References Cited

U.S. PATENT DOCUMENTS

| | | | |
|---|---|---|---|
| 2005/0282574 A1* | 12/2005 | Li et al. | 455/522 |
| 2006/0003560 A1 | 1/2006 | Regul et al. | |
| 2006/0035660 A1 | 2/2006 | Anderson | |
| 2007/0026865 A1* | 2/2007 | Yano et al. | 455/438 |
| 2007/0097928 A1 | 5/2007 | Anderson | |
| 2007/0195734 A1 | 8/2007 | Das et al. | |
| 2008/0130588 A1* | 6/2008 | Jeong | H04W 74/002 370/335 |
| 2008/0242337 A1* | 10/2008 | Sampath et al. | 455/522 |
| 2010/0080154 A1* | 4/2010 | Noh et al. | 370/310 |
| 2010/0232384 A1* | 9/2010 | Farajidana | H04L 5/005 370/329 |

FOREIGN PATENT DOCUMENTS

| | | | |
|---|---|---|---|
| JP | 2000197112 A | 7/2000 | |
| JP | 2000232675 A | 8/2000 | |
| JP | 2002223239 A | 8/2002 | |
| JP | 2004207921 A | 7/2004 | |
| JP | 2006514516 A | 4/2006 | |
| JP | 2007036664 A | 2/2007 | |
| JP | 2009505446 A | 2/2009 | |
| JP | 2009514286 A | 4/2009 | |
| WO | WO 2004/038986 A2 | 5/2004 | |
| WO | WO 2009/023681 A2 | 2/2009 | |
| WO | WO 2009/023860 A1 | 2/2009 | |

OTHER PUBLICATIONS

Japanese Notice of Preliminary Rejection, Japanese Application No. 2010-237533 dated Apr. 8, 2014, 6 pages.
Translated Chinese Office Action in conntection with Chinese Application No. 201010516082.7 dated Apr. 22, 2014, 16 pages.
Decision of Rejection dated Feb. 9, 2015 in connection with Japanese Patent Application No. 2010-237533; 6 pages.
Translated Chinese Office Action dated Oct. 9, 2015 in connection with Chinese Patent Application No. 201010516082.7, 13 pages.
Chinese Office Action issued for CN 201010516082.7 dated Apr. 6, 2014, 14 pgs.
Trial Decision Office Action issued for Japanese Serial No. 2010-237533 dated May 16, 2016, 21 pgs.

* cited by examiner

PREAMBLE

FIG.6A

| PREAMBLE | MESSAGE |
|          | PILOT   |

FIG.6B

APPARATUS AND METHOD FOR RANDOM ACCESS CHANNEL TRANSMISSION CONSIDERING REVERSE CHANNEL STATUS IN WIRELESS COMMUNICATION SYSTEM

CROSS-REFERENCE TO RELATED APPLICATION(S) AND CLAIM OF PRIORITY

The present application is related to and claims priority under 35 U.S.C. §119 to an application entitled "Apparatus and method for random access channel transmission in a wireless communication system" filed in the Korean Intellectual Property Office on Oct. 22, 2009 and allocated Serial No. 10-2009-0100626 and the Korean Intellectual Property Office on Oct. 21, 2010 and assigned Serial No. 10-2010-0103077, the contents of which are incorporated herein by reference.

TECHNICAL FIELD OF THE INVENTION

The present invention relates generally to an apparatus and a method for transmitting a Random Access Channel (RACH) in a wireless communication system, and in particular, to an apparatus and method for transmitting a signal through a RACH in consideration of reverse link channel information in a remote node of a wireless communication system.

BACKGROUND OF THE INVENTION

A wireless communication system makes use of a RACH as a reverse common channel for transmission of random burst-type data. The random access channel means a channel configured to possibly transmit a short burst-type data via a reverse link by a remote node in a wireless communication system. For example, a wireless communication system of 3rd Generation Partnership Project (3GPP) standard uses a RACH that includes a preamble. For another example, a wireless communication system of 3GPP2 standard uses a random access channel configured with a preamble and a short message.

When a remote node transmits a signal through a random access channel, a host node desires that a signal received from the remote node through the random access channel satisfy some level of detection probability and false alarm probability conditions. Therefore, the remote node has a problem of necessarily setting transmission power of a signal transmitted through the random access channel to a high value. Also, it can be problematic that a service area of a reverse link has been restricted due to maximum transfer power and a fading of a remote node. For example, if a length of a preamble is 1 ms and the maximum transfer power of a remote node using a random access channel transmission mode is 250 mW, a reverse service area is limited to 2 Km. However, if a preamble length becomes longer, a system capacity reduces according to the increase of an overhead by the preamble.

SUMMARY OF THE INVENTION

An aspect of the present invention is to substantially solve at least the above problems and/or disadvantages and to provide at least the advantages below. Accordingly, an object of the present invention is to provide an apparatus and a method for reducing a power consumption of a remote node according to a random access channel transfer in a wireless communication system.

Another object of the present invention is to provide an apparatus and a method for enlarging a service area of a reverse link restricted by a random access channel transfer in a wireless communication system.

Still another object of the present invention is to provide an apparatus and a method for selectively conducting a random access channel transfer in consideration of a channel status of a reverse link in a remote node of a wireless communication system.

Still another object of the present invention is to provide an apparatus and a method for determining transmission power for a random access channel transfer in consideration of a channel gain of a reverse link in a remote node of a wireless communication system.

According to one aspect of the present invention, there is provided a method for transmitting a signal through a Random Access Channel in a remote node of a wireless communication system using a Time Division Duplex mode. The method includes estimating a reverse channel status using a signal received through a forward link. The method also includes determining whether to transmit a signal through a random access channel in consideration of the reverse channel status. The method further includes transmitting a signal through the random access channel when it is determined to transmit a signal through the random access channel.

According to another aspect of the present invention, a remote node apparatus is provided for transmitting a signal through a Random Access Channel in a remote node of a wireless communication system using a Time Division Duplex mode. The apparatus includes a reception device receiving a signal. The apparatus also includes a channel estimation unit estimating a reverse channel status using a signal received through a forward link at the reception device. The apparatus further includes a control unit determining whether to transmit a signal through a random access channel in consideration of the reverse channel status. The apparatus still further includes a transmission device transmitting a signal through the random access channel when it is determined at the control part to transmit a signal through the random access channel.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

FIGS. 1 through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system. Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Embodiments of the present invention provide a technique for supporting a selective suspend mode in a Universal Serial Bus (USB) composite network device. Herein, the selective suspend mode is supported only in some of one or more devices of the composite network device in an idle mode. That is, the selective suspend mode is supported only in some of the devices in the idle mode, compared to the idle mode in which the entire composite network device operates in the idle mode.

The present invention is intended to provide technologies for performing a Random Access Channel (RACH) transmission considering a reverse channel status in a wireless communication system.

In the following, it is assumed that a wireless communication system of the present invention employs a Time Division Duplex (TDD) mode.

In the following description, a Random Access Channel can be applied irrespective of a construction type of the Random Access Channel. For example, the Random Access Channel may be configured to include only a preamble. In another example, the Random Access Channel also may be configured to include a preamble and a short-length message.

In the following description, a host node indicates a node configured to transmit a signal through a forward link, and a remote node indicates a node configured to transmit a signal through a reverse link.

In the following description, it is assumed that a host node continuously or periodically transmits a channel (for example, a pilot channel) from which a remote node determines the channel state of a forward link. Also, when using a Time Division Duplex mode, it may be assumed that a status of a forward channel and a reverse channel are equal according to channel reciprocity characteristics. Therefore, it is assumed in the following description that a remote node makes use of a channel status value of a forward link as that of a reverse link.

Figure 1:
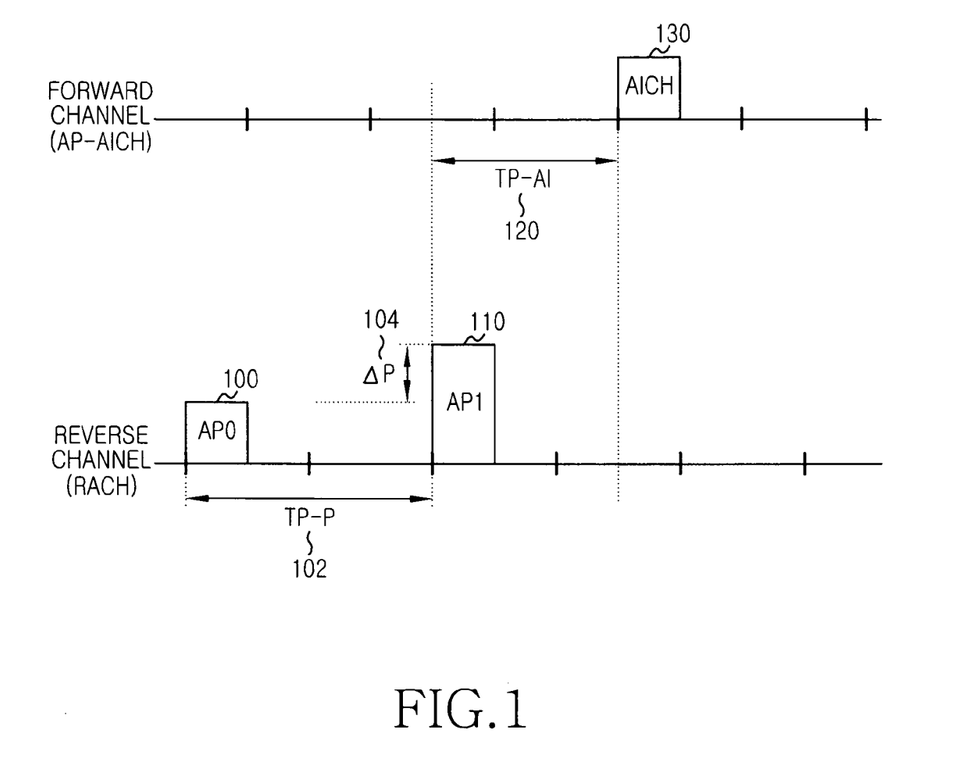
FIG. 1 illustrates a signal transmission structure through an uplink RACH in a wireless communication system according to an embodiment of the present invention.

A remote node transmits a signal through a Random Access Channel as illustrated in FIG. 1.

FIG. 1 illustrates a signal transmission structure through an uplink RACH in a wireless communication system according to an embodiment of the present invention.

Referring to FIG. 1, a forward channel is presumed to be an Access Preamble-Acquisition Indication Channel (AP-AICH), and a reverse channel is assumed to be a Random Access Channel.

Figure 6A:
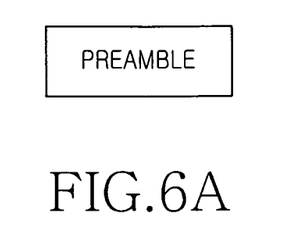
FIGS. 6A and 6B illustrate the construction of an Access Probe (AP) transmitted through a RACH according to an embodiment of the present invention.
Figure 6B:
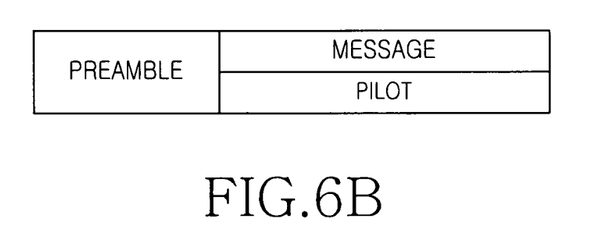

As shown in the figure, a remote node transmits a preamble through a Random Access Channel of a reverse link for an initial synchronization of communication. At this time, the remote node transmits $0^{th}$ Access Probe (AP0) 100 containing a preamble through the Random Access Channel. For example, the remote node transmits an Access Probe configured as shown in FIGS. 6A and 6B through an Access Probe.

The remote node re-transmits AP1 (110), which is increased ΔP in transmission power over AP0 (100) through a Random Access Channel, if it has not received a response signal to AP0 (100) from a host node for tp-p 102 time span. At this time, AP1 110 contains a preamble configured as the same signature to AP0 (100).

If a host node has received AP1 (110) through a Random Access Channel, the host node transmits the same signature as AP1 (110) through AICH 130 after waiting for tp-a 120 time span.

Even though not shown, the remote node determines signature and Acquisition Indicator (AI) by demodulating a signal provided through AICH 130. If an ACK of a host node is determined through the Acquisition Indicator, the remote node transmits a message containing a reverse data to the host node through a reverse random access channel after waiting for tp-mag time. For example, the remote node transmits an Access Probe containing a message configured as shown in FIG. 6(a) through a Random Access Channel. At this time, the remote node transmits the Access Probe by transmission power corresponding to the AP1 (110).

As described above, a remote node may transmit a Random Access Channel considering a reverse channel status. That is, the remote node can transmit a Random Access Channel if a reverse channel state is more than a reference value. The reference value is determined considering a service QoS of a remote node and a statistic characteristic of a channel. Here, the statistic characteristic of a channel includes the Doppler frequency of a wireless channel, an average of reception signal versus noise ratios, and an average of reception power levels.

The reference value can be determined at a remote node or a host node. For example, if the reference value is determined at a host node, the host node may determine the reference value by considering a service QoS of a remote node as shown in the following FIG. 2.

Figure 2:
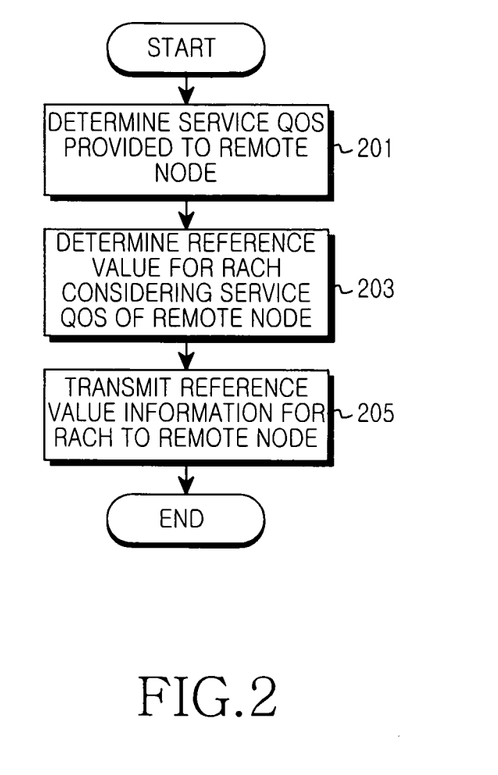
FIG. 2 illustrates a process for controlling a signal transmission of a RACH of a remote node at a host node according to an embodiment of the present invention.

FIG. 2 illustrates a process for controlling a signal transmission through a RACH of a remote node by a host node according to an embodiment of the present invention.

Referring to FIG. 2, the host node determines a QoS of services provided to a remote in step 201.

After that, in step 203, the host node decides a reference value for determining whether the remote node is to transmit a Random Access Channel or not by considering service QoS of the remote node. For example, if a host node provides real time services to a remote node, the host node sets a reference value low for reducing a delay of the remote node. In another example, if a host node provides non-real time services to a remote node, the host node sets the reference value high.

After the reference value is decided, in step 205, and the host node transmits the determined reference value to the remote node. For example, the host node may transmit the reference value information through a broadcast channel. In another example, the host node may transmit the reference value information through a dedicated channel, which enables a dormant state for a specific remote station. Here, a dormant state means the state when no dedicated physical resource is allocated to a remote state but the higher layer connection is maintained. A dormant state can be used to save the power consumption of a remote station in wireless data service, when there is burst traffics.

After that, the process of FIG. 2 ends.

In the described example, a host node determines one reference value by determining whether a remote node transmits a random access channel.

In another example, a host node may also decide a number of reference values according to channel conditions. For example, the host node may determine a number of reference values according to Doppler frequencies as shown in the following Table 1.

TABLE 1

| QoS | Doppler frequency | Reference |
|---|---|---|
| QoS1 (real time services) | 0~10 Hz | 0.1 |
| | 10~20 Hz | 0.2 |
| | 20~30 Hz | 0.3 |
| QoS2 (non-real time services) | 0~10 Hz | 0.2 |
| | 10~20 Hz | 0.4 |
| | 20~30 Hz | 0.6 |

As shown in Table 1, a host node transmits a number of reference values according to a service QoS provided to a remote node and the Doppler frequency of a channel and transmits them to a remote node. At this time, the host node sets a reference value of non-real time services high that is less sensitive to a time delay than a real time service. Also, the host node sets a reference value high as the Doppler frequency of a channel becomes higher.

A remote node can determine a reference value in consideration of service QoS to be communicated with the host node and the Doppler frequency of a channel among reference values provided from a host node. Also, the remote node also may change into a reference value according to a corresponding QoS and a Doppler frequency in Table 1, when service QoS alters or the Doppler frequency of a channel varies.

In another example, a host node notifies a time limit allowing for a random access transmission according to QoS to a remote node, and the remote node may compute a reference value for optimizing transmission power while transmitting a Random Access Channel in the time limit. For example, the host node determines one reference value as shown in Table 2 below that determines if a remote node transmits a random access channel using delay performance of a Random Access Channel and statistic characteristics of a channel. As another example, a reference value such as shown in Table 2 below may be determined at the remote node through a simulation according to standards or channel environments. Here, it is assumed that delay performance of a Random Access Channel of Table 2 uses an average delay of a Random Access Channel, and statistical characteristics of a channel uses the Doppler frequency of a channel.

TABLE 2

| QoS | Doppler frequency | Reference |
|---|---|---|
| Average delay time 100 ms | 0~10 Hz | 0.1 |
| | 10~20 Hz | 0.2 |
| | 20~30 Hz | 0.3 |
| Average delay time 500 ms | 0~10 Hz | 0.2 |
| | 10~20 Hz | 0.4 |
| | 20~30 Hz | 0.6 |

A remote node may select a reference value using Table 2 pursuant to the Doppler frequency of a channel, when delay performance according to service characteristics is determined.

In a Time Division Duplex mode in a wireless communication system, a forward link and a reverse link both use the same frequency. And thus, a remote node transmits a Random Access Channel considering a reverse channel status estimated through the intensity of a forward link signal as shown in the following FIG. 3. At this point, the remote node may estimate a reverse channel status using a power level of a received signal, the path attenuation of a received signal, Signal to Noise Ratio (SNR) of a reception signal, a forward channel gain, or the like. In the following description, it is presumed for ease of explanation that a remote node estimates a reverse channel status using the power level of the received signal over the forward link.

Figure 3:
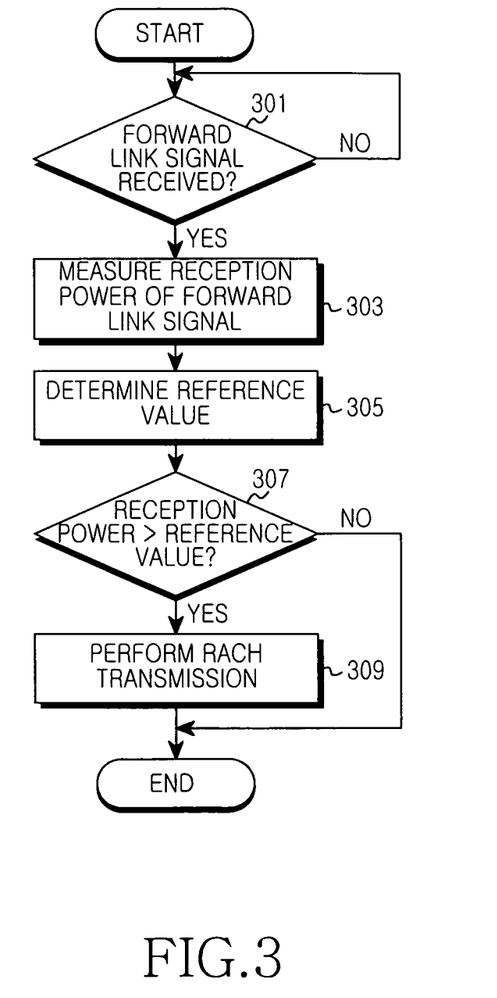
FIG. 3 illustrates a process for transmitting a signal through a RACH at a remote node according to an embodiment of the present invention.

FIG. 3 illustrates a process for transmitting a signal through a RACH at a remote node according to an embodiment of the present invention.

Referring to FIG. 3, the remote node determines that a forward signal transmitted by a host node has been received in step 301.

In step 303, when a forward signal is received, the remote node measures the power of a forward signal received from the host node.

After that, in step 305, the remote node determines a reference value for determining whether a Random Access Channel is to be transmitted. For example, the remote node determines a reference value for determining whether to transmit a Random Access Channel by considering service QoS required by a user and a statistical characteristic of a channel. In another example, the remote node may be provided with a reference value from a host node for determining that a random access channel transfer is performed or not. In still another example, the remote node may select any one reference value among a number of reference values by considering statistical characteristics of a channel used in a communication. At this time, the remote node may select a reference value considering Doppler frequency, that is, a statistical characteristic of a channel.

In step 307, after determining a reference value for determining that a random access channel transfer is performed, the remote node compares a power of a forward signal measured in step 303 and a reference value determined in step 305.

If the forward signal power is equal or smaller than the reference value, the remote node determines that a reverse channel status is not suitable for random access channel transmission. Thus, the remote node does not transmit a Random Access Channel.

Alternatively, if the forward signal power is greater than the reference value, the remote node determines that a reverse channel status conforms to random access channel transmission. Thus, in step 309, the remote node transmits a signal through a reverse random access channel.

After that, the process of FIG. 3 ends.

As described above, if a remote node transmits a random access channel considering a reverse channel status, the remote node can determine a power to be used for random access channel transmission through an open loop.

Also, the remote node may transmit a random access channel using power of a certain magnitude so that a host note can easily estimate the channel status of a reverse link.

Figure 4:
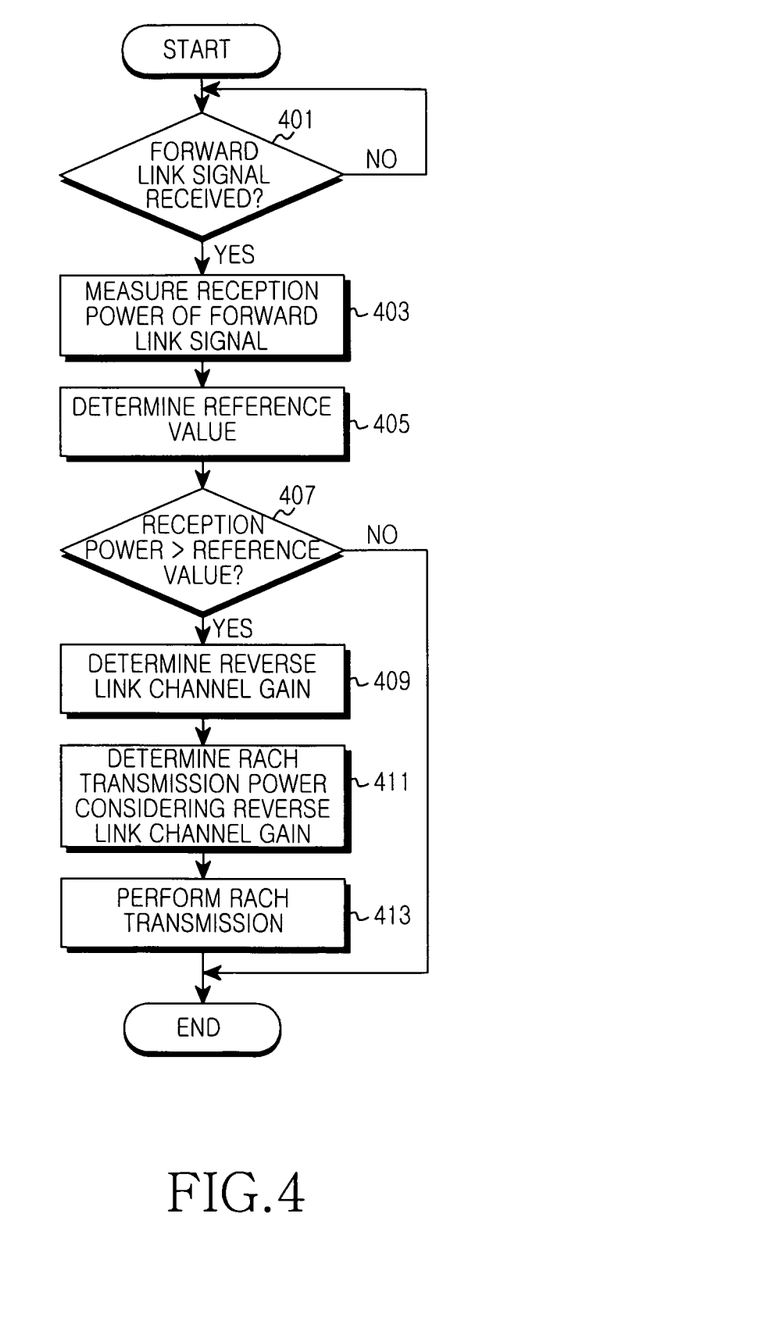
FIG. 4 illustrates a process for transmitting a signal through a RACH at a remote node according to another embodiment of the present invention.

Also, the remote node may determine a power to be used in a random access channel transmission in consideration of a reverse channel gain as shown in FIG. 4.

FIG. 4 illustrates a process for transmitting a signal through a RACH at a remote node according to another embodiment of the present invention.

Referring to FIG. 4, the remote node determines that a forward signal transmitted by a host node has been received in step 401.

In step 403, when a forward signal is received, the remote node measures the power of a forward signal received from the host node.

After that, in step 405, the remote node determines a reference value for determining whether a Random Access Channel is to be transmitted. For example, the remote node determines a reference value for determining whether to transmit a Random Access Channel by considering a service QoS required by a user and a statistical characteristic of a channel. In another example, the remote node may be provided with a reference value from a host node for determining that a random access channel is transmitted or not. In still another example, the remote node may select any one reference value among a number of reference values by considering statistical characteristics of a channel used in a communication. At this time, the remote node may select a reference value considering Doppler frequency, that is, a statistical characteristic of a channel.

In step 407, after determining a reference value for determining that a random access channel transfer is performed, the remote node compares a power of a forward signal measured in step 403 and a reference value determined in step 405.

If the forward signal power is equal or smaller than the reference value, the remote node determines that a reverse channel status is not suitable for a random access channel transmission. Thus, the remote node does not transmit a Random Access Channel.

Alternatively, if the forward signal power is greater than the reference value, the remote node determines that a reverse channel status is good enough for random access channel transmission. Thus, in step 409, the remote node determines a gain of a reverse channel.

After that, in step 411, the remote node determines transmission power to be used in a random access channel transmission by considering a reverse channel gain determined in step 409. For example, the remote node determines transmission power to be used in the random access channel transfer in order to be in inverse proportion to a reverse channel gain. In another example, the remote node may determine the transmission power proportional to the ratio between the average propagation loss and the instantaneous reverse channel gain for random access channel transmission. In still another example, the remote node may maintain transmission power to be used for the transmission of a random access channel at a certain level regardless of the instantaneous gain of a reverse channel. Here, the certain level may be set proportional to average path attenuation between a host node and a remote node.

After transmission power to be used in the random access channel transfer is determined, the remote node proceeds to step 413 and transmits a signal through a reverse random access channel. At this time, the remote node transmits a signal with transmission power determined in step 411.

After that, the process of FIG. 4 ends.

In the following description, the structure of a remote mode for performing random access channel transmission considering a reverse channel status will be described. For ease of explanation, it is assumed that the remote node uses Doppler frequency as statistical characteristics of a channel.

Figure 5:
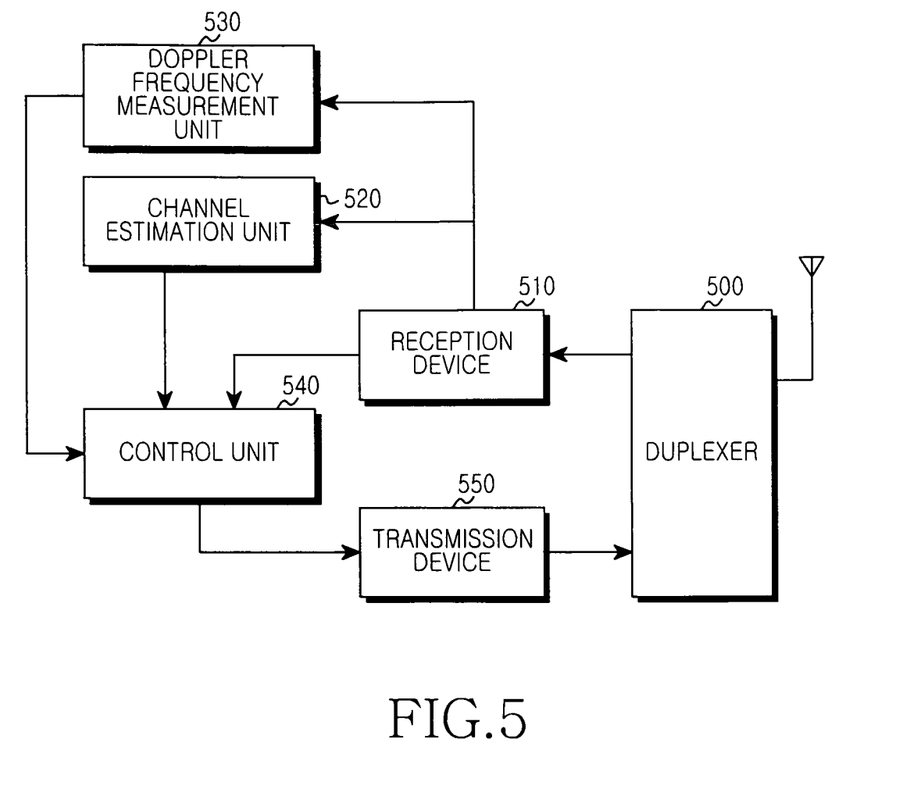
FIG. 5 illustrates a remote node for transmitting a signal through an RACH according to an embodiment of the present invention.

FIG. 5 illustrates a remote node for transmitting a signal through a RACH according to an embodiment of the present invention.

As shown in FIG. 5, a remote node includes a duplexer 500, a reception device 510, a channel estimator 520, a Doppler frequency estimating unit 530, a control unit 540, and a transmission device 550.

The duplexer 500 transfers a transmission signal provided from the transmission device 550 via an antenna according to a duplexing mode, and supplies a received signal from an antenna to the reception device 510.

The reception device 510 restores data provided from the duplexer 500. For example, the reception device 510 includes an RF reception block, a demodulation block, a channel decoding block, and the like. The RF reception block is comprised of a filter and an RF pre-processor. The demodulation block is comprised of an FFT computer for extracting data carried on each sub-carrier when a wireless communication system employs an Orthogonal Frequency Division Multiplexing. The channel decoding block is comprised of a demodulator, a de-interleaver and a channel decoder, and the like.

The channel estimation unit 520 estimates a forward channel using a reception signal provided from the reception device 510. For example, the channel estimation unit 520 estimates the reception power of a received signal using a pilot of a forward signal.

The Doppler frequency estimation unit 530 estimates a Doppler frequency between a remote node and a host node using a received signal provided from the reception device 510. That is, the Doppler frequency estimation unit 530 estimates a Doppler frequency by a change in a signal received through a forward channel.

The control unit 540 determines whether a Random Access Channel is to be transmitted based on status information of a forward link channel provided from the channel estimation unit 520. That is, the control unit 540 determines the transmission of a Random Access Channel or not by comparing power of an estimated received signal from the channel estimation unit 520 to a reference value. For example, when the power of a received signal estimated at the channel estimation unit 520 is equal or smaller than a reference, the control unit 540 determines that a reverse channel status is unsuitable for a random access channel transfer. And thus, the control unit 540 controls the transmission device 550 to transmit a random access channel. In another example, when the power of a received signal estimated at the channel estimation unit 520 is greater than the reference value, the control unit 540 determines that a reverse channel status is suitable for a random access channel transmission. And thus, the control unit 540 controls the transmission device 550 to transmit a random access channel.

At this time, the control unit 540 determines whether to transmit a Random Access Channel using a reference value provided from a host node. In another example, the control unit 540 may calculate a reference value in consideration of a service QoS required by a user. In still another example, the control unit 540 may use a fixed reference value. In still another example, the control unit 540 may select a corresponding reference value from Table 1 using a service QoS and a Doppler frequency estimated at the Doppler frequency estimation unit 530. In still another example, the control unit 540 may select a corresponding reference value from Table 2 using delay characteristics according to a service QoS and a Doppler frequency estimated at the Doppler frequency estimation unit 530.

The transmission device 550 generates a signal to be transmitted through a Random Access Channel to a base station according to a control of the control unit 540. That is, the transmission device 550 transforms a signal to be transmitted through a Random Access Channel to a base station into a format transmitted through radio resources and provides it to the duplexer 500 if the control unit 540 controls performance of a random access channel transfer. For example, the transmission device 550 is comprised of a signal generation block, a channel coding block, a modulation block, and an RF transmission block. The channel coding block is comprised of a modulator, an interleaver and a channel encoder. The modulation block is composed of an IFFT computer for mapping data to each sub-carrier in a wireless communication system that uses an Orthogonal Frequency Division Multiplexing. The RF transmission block is comprised of a filter, an RF pre-processor, and the like.

Although not shown, the remote node further includes a power control unit that determines transmission power to be used in a random access channel transfer considering a reverse channel gain. At this time, the power control unit determines the transmission power of a Random Access Channel considering a reverse channel gain. For example, the power control unit determines transmission power to be used for a random access channel to be inversely proportional to a reverse channel gain. In another example, the power control unit may maintain transmission power to be used for the transmission of a random access channel as a certain level without regard to an instantaneous gain of a reverse channel. Here, a certain level may be set proportional to average path attenuation between a host node and a remote node.

In the above described embodiment, a remote node determines whether to transmit a random access channel or not considering a reception power of a forward signal.

In another embodiment, a remote node determines whether to transmit a random access channel considering a fading value of a forward channel. At this time, the remote node can calculate a fading value of a forward channel such as shown in Equation 1.

$$Y = (\text{instantaneous pilot reception power})/(\text{average pilot channel reception power}) \quad [\text{Eqn. \#1}]$$

where Y denotes a fading value of a forward channel.

At this time, if a fading value of a forward channel such as determined in Equation 1 is greater than a reference value, a remote node determines that a reverse channel status is suitable for a random access channel transfer. And thus, the remote node transmits a reverse random access channel.

Alternatively, if the fading value of a forward channel such as determined in Equation 1 is equal or smaller than a reference value, a remote node determines that a reverse channel status is unsuitable for a random access channel transfer. And thus, the remote node does not transmit a reverse random access channel.

As described above, a remote node of a wireless communication system can selectively perform a random access channel transmission considering a channel status of a reverse link, thereby advantageously improving a success rate of a reverse access channel, reducing a power consumption of a terminal for transmitting a signal through the reverse access channel, and enlarging a service area of a reverse link limited by maximum transmission power.

While the specification of the invention has been described with reference to certain preferred embodiments thereof, various changes may be made therein without departing from the scope of the invention. Therefore, the scope of the present invention is not limited to the described embodiment, but should be defined by the appended claims and its equivalents.

What is claimed is:

1. A method of transmitting a signal through a Random Access Channel by a remote node of a wireless communication system, the method comprising:
   estimating a reverse channel status using a first signal received through a forward link;
   identifying a reference value for determining to transmit a second signal through the random access channel based on the estimated reverse channel status;
   determining whether to transmit the second signal through the random access channel by comparing the reverse channel status to the reference value;
   transmitting the second signal through the random access channel if the reverse channel status is greater than the reference value; and
   suspending transmission of the second signal through the random access channel if the reverse channel status is not greater than the reference value.

2. The method of claim 1, wherein estimating the reverse channel status comprises:
   estimating the reverse channel status using at least one of a power level of a signal received through a forward link, a path attenuation of a signal received through a forward link, a Signal to Noise Ratio (SNR) of a reception signal through a forward link, and a forward channel gain.

3. The method of claim 1, wherein estimating the reverse channel status comprises:
   calculating a fading value of a reverse channel using a power level of a signal received through a forward link.

4. The method of claim 1 further comprising:
   receiving at least one reference value provided from a host node.

5. The method of claim 4 further comprising:
   selecting one reference value by considering at least one of a service quality of service and statistic characteristics of a channel when at least two reference values are provided from the host node.

6. The method of claim 4 further comprising:
   selecting one reference value by considering at least one of a delay time of the random access channel and statistic characteristics of a channel when at least two reference values are provided from the host node.

7. The method of claim 1 further comprising:
   identifying the reference value using at least one of a service quality of service and statistic characteristics of a channel.

8. The method of claim 1 further comprising:
   identifying the reference value using at least one of a delay time of the random access channel and statistic characteristics of a channel.

9. The method of claim 1, wherein transmitting the second signal through the random access channel comprises:
determining a transmission power based on a reverse channel gain in response to determining to transmit the second signal through the random access channel; and
transmitting the second signal through the random access channel using the determined transmission power.

10. The method of claim 9, wherein determining the transmission power comprises:
determining the transmission power based on propagation attenuation and an instantaneous reverse channel gain.

11. A remote node apparatus configured to transmit a signal through a Random Access Channel, the remote node apparatus comprising:
a reception device configured to receive a first signal;
a channel estimation unit configured to estimate a reverse channel status using the first signal received through a forward link at the reception device;
a control unit configured to identify a reference value for determining to transmit a second signal through the random access channel based on the estimated reverse channel status; and determine whether to transmit the second signal through the random access channel by comparing the reverse channel status to the reference value; and
a transmission device configured to transmit the second signal through the random access channel if the reverse channel status is greater than the reference value; and suspend transmission of the second signal through the random access channel if the reverse channel status is not greater than the reference value.

12. The remote node apparatus of claim 11, wherein the channel estimation unit is configured to estimate a reverse channel status using at least one of a power level of a signal received through a forward link, a path attenuation of a signal received through a forward link, a Signal to Noise Ratio (SNR) of a reception signal through a forward link, and a forward channel gain.

13. The remote node apparatus of claim 11, wherein the channel estimation unit is configured to calculate a fading value of a reverse channel using a power level of a signal received through a forward link.

14. The remote node apparatus of claim 11 further comprising:
a reception device configured to receive at least one reference value from a host node.

15. The remote node apparatus of claim 14, wherein the control unit is configured to select one reference value by considering at least one of a delay time of the random access channel and statistic characteristics of a channel when at least two reference values are provided from the host node.

16. The remote node apparatus of claim 14, wherein the control unit is configured to select one reference value by considering at least one of a delay time of the random access channel and statistic characteristics of a channel when at least two reference values are provided from the host node.

17. The remote node apparatus of claim 11, wherein the control unit is configured to identify the reference value using at least one of a service quality of service value and statistic characteristics of a channel.

18. The remote node apparatus of claim 11, wherein the control unit is configured to identify the reference value using at least one of a delay time of the random access channel and statistic characteristics of a channel.

19. The remote node apparatus of claim 11, further comprising:
a power control unit configured to determine transmission power based on a reverse channel gain in response to the determination to transmit the second signal through the random access channel,
wherein the transmission device is configured to transmit the second signal through the random access channel using transmission power determined at the power control unit.

20. The remote node apparatus of claim 19, wherein the power control unit is configured to determine the transmission power based on propagation attenuation and an instantaneous reverse channel gain.

* * * * *